United States Patent
Luss et al.

(10) Patent No.: US 11,061,811 B2
(45) Date of Patent: Jul. 13, 2021

(54) OPTIMIZING SOFTWARE TESTING VIA GROUP TESTING

(71) Applicant: International Business Machines Corporation, Armonk, NY (US)

(72) Inventors: Ronny Luss, Yorktown Heights, NY (US); Dmitry M. Malioutov, Yorktown Heights, NY (US); Omer Tripp, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 293 days.

(21) Appl. No.: 15/842,978

(22) Filed: Dec. 15, 2017

(65) Prior Publication Data

US 2019/0188120 A1    Jun. 20, 2019

(51) Int. Cl.
*G06F 9/44* (2018.01)
*G06F 11/36* (2006.01)

(52) U.S. Cl.
CPC ...... *G06F 11/3692* (2013.01); *G06F 11/3684* (2013.01); *G06F 11/3688* (2013.01)

(58) Field of Classification Search
CPC ............. G06F 11/3692; G06F 11/3684; G06F 11/3688
See application file for complete search history.

(56) References Cited

U.S. PATENT DOCUMENTS

| | | | |
|---|---|---|---|
| 8,479,171 B2 | 7/2013 | Ghosh | |
| 9,135,147 B2 | 9/2015 | Artzi et al. | |
| 9,262,309 B2 | 2/2016 | Tripp et al. | |
| 9,477,583 B2 | 10/2016 | Maddela | |
| 9,535,824 B2 | 1/2017 | Tripp et al. | |
| 2005/0114838 A1* | 5/2005 | Stobie | G06F 11/3672 717/124 |
| 2006/0075392 A1* | 4/2006 | Carrier | G06F 8/38 717/136 |
| 2010/0205588 A1* | 8/2010 | Yu | G06F 8/4441 717/149 |
| 2015/0095893 A1* | 4/2015 | Tripp | G06F 11/3684 717/127 |
| 2015/0256206 A1* | 9/2015 | Nakagata | H03M 13/2906 714/759 |
| 2016/0260501 A1* | 9/2016 | Chen | G06F 11/1048 |
| 2018/0121271 A1* | 5/2018 | Grealish | G06F 11/3692 |

(Continued)

OTHER PUBLICATIONS

Kawaguchi et al. (Adaptive Boolean Compressive Sensing by Using Multi-Armed Bandit) (Year: 2016).*

(Continued)

*Primary Examiner* — Chat C Do
*Assistant Examiner* — Lenin Paulino
(74) *Attorney, Agent, or Firm* — Anthony Curro, Esq.; McGinn I.P. Law Group, PLLC.

(57) ABSTRACT

A Software optimization method, system, and computer program product, include defining a vocabulary of tokens to yield admissible inputs of a system, generating random test inputs based on combining inputs and input tuples, followed by application of these inputs into the system, and analyzing the correlations between system failures and the tokens present in respective inputs to localize failures to particular inputs and input tuples.

10 Claims, 6 Drawing Sheets

(56) References Cited

U.S. PATENT DOCUMENTS

2019/0171665 A1* 6/2019 Navlakha .............. G06F 16/532

OTHER PUBLICATIONS

Fatemi et al. (Randomized Recovery for Boolean Compressed Sensing) (Year: 2013).*
Fatemi et al. (Randomized Recovery got Boolean Compressed Sensing, Oct. 2013) (Year: 2013).*
Kawaguchi et al. (Adaptive Boolean Compressive Sensing by Using Multi-Armed Bandit, Mar. 2016 (Year: 2016).*
Mel, et al. "The NIST Definition of Cloud Computing". Recommendations of the National Institute of Standards and Technology. Nov. 16, 2015.
D. Leon, and A. Podgurski, "A comparison of coverage-based and distribution-based techniques for filtering and prioritizing test cases," 14th International Symposium on Software Reliability Engineering, 2003. ISSRE 2003, Year: 2003, pp. 442-453.
Jaypal D. Rangari, and Swapnili P. Karmore, "Comparative analysis and development of new approach for random testing," 2014 International Conference on Circuits, Systems, Communication and Informational Technology Applications (CSCITA), Year: 2014, pp. 332-335.
Eric Knauss, Miroslaw Staron, Wilhelm Meding, Ola Söder, Agneta Nilsson, and Magnus Castell, "Supporting Continuous Integration by Code-Churn Based Test Selection," 2015 IEEE/ACM 2nd International Workshop on Rapid Continuous Software Engineering, Year: 2015, pp. 19-25.
Rubing Huang, Xiaodong Xie, Tsong Yueh Chen, and Yansheng Lu, "Adaptive Random Test Case Generation for Combinatorial Testing," 2012 IEEE 36th Annual Computer Software and Applications Conference, Year: 2012, pp. 52-61.

* cited by examiner

OPTIMIZING SOFTWARE TESTING VIA GROUP TESTING

TECHNICAL FIELD

The present invention relates generally to a software optimization method, and more particularly, but not by way of limitation, to a system, method, and recording medium for recovering a small distinguished subset of tokens from a large population while efficiently reducing the total number of tests.

BACKGROUND

Conventionally, there is a problem of detecting, or inducing, failures in the presence of relationships, or dependencies, between different parts of the input in software testing. Testing is the most popular way of ensuring software quality. Despite that, there are few principled methods to automatically test software, delta debugging being a notable exception.

SUMMARY

In an exemplary embodiment, the present invention can provide a computer-implemented method, the method including defining a vocabulary of tokens to yield admissible inputs of a system, generating random test inputs based on combining inputs and input tuples, followed by application of these inputs into the system, and analyzing the correlations between system failures and the tokens present in respective inputs to localize failures to particular inputs and input tuples.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart, from the spirit and scope of the present invention.

BRIEF DESCRIPTION OF THE DRAWINGS

Aspects of the invention will be better understood from the following detailed description of the exemplary embodiments of the invention with reference to the drawings, in which FIG. 1 exemplarily shows a high-level flow chart for a software optimization method 100;

FIG. 2 exemplarily depicts a Boolean problem for solving according to an embodiment of the present invention;

DETAILED DESCRIPTION

Figure 1:
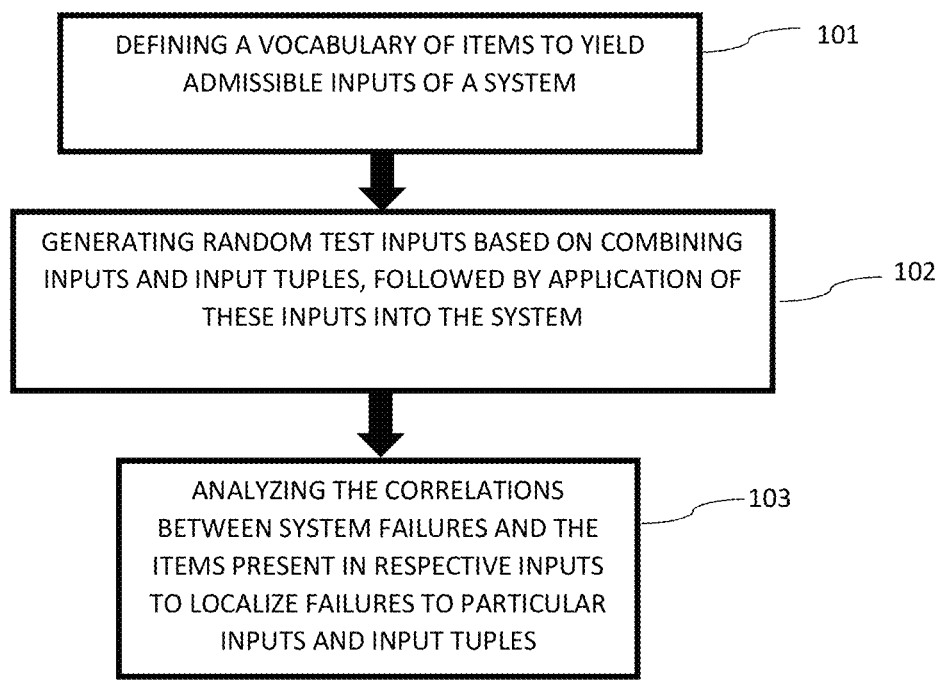

The invention will now be described with reference to FIGS. 1-6, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the method 100 includes various steps to leverage results from the area of combinatorial mathematics and mathematical programming to formulate a novel testing approach by breaking up the task of locating elements of interest into tests on sub-sets (or groups) rather than on individual elements.

Figure 4:
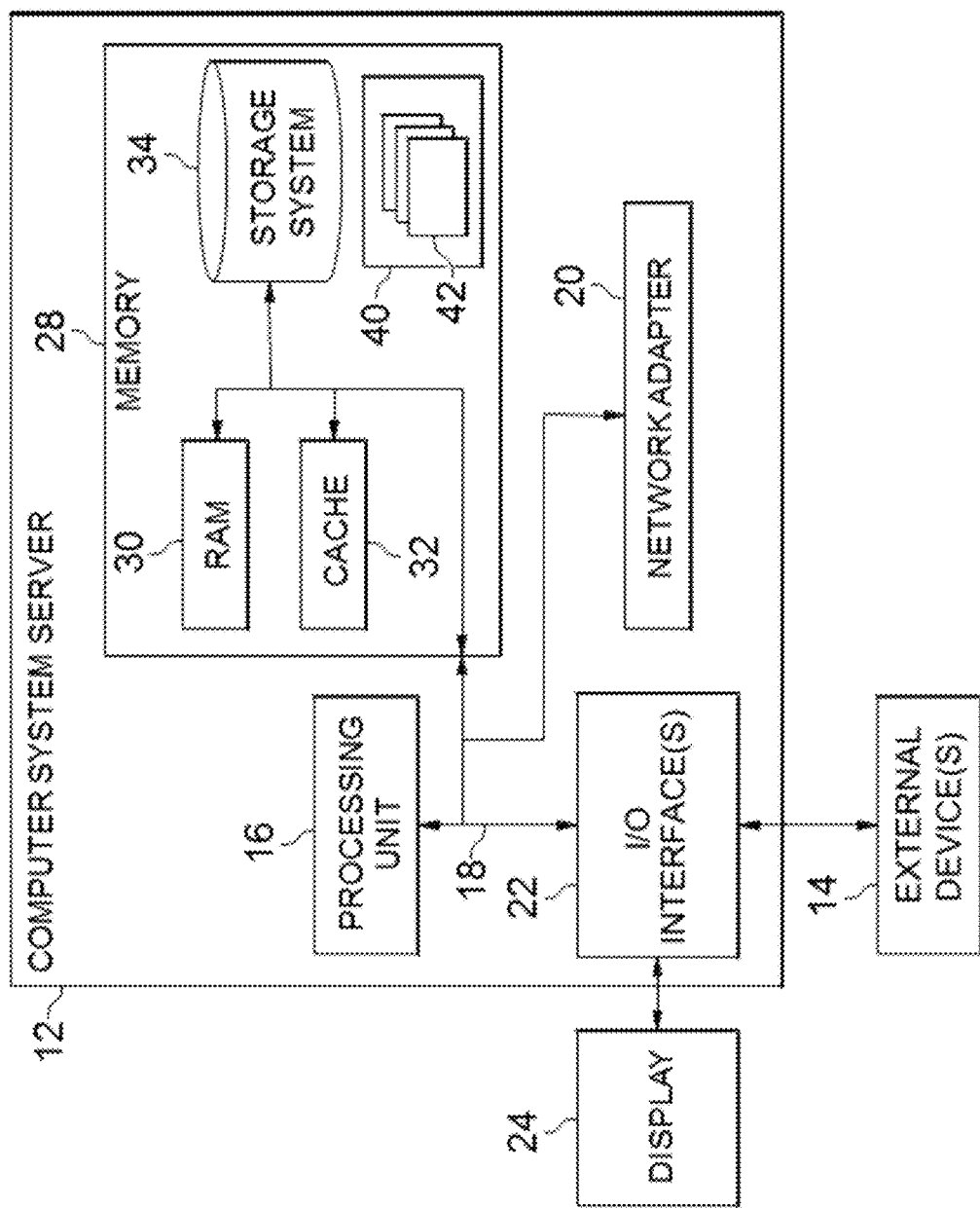
FIG. 4 depicts a cloud computing node 10 according to an embodiment of the present invention.

As shown in at least FIG. 4, one or more computers of a computer system 12 according to an embodiment of the present invention can include a memory 28 having instructions stored in a storage system to perform the steps of FIG. 1.

Although one or more embodiments (see e.g., FIGS. 4-6) may be implemented in a cloud environment 50 (see e.g., FIG. 5), it is nonetheless understood that the present invention can be implemented outside of the cloud environment.

Referring generally to FIG. 1, the method 100 utilizes the general theory of compressed sensing and group testing, which are the main mathematical tools that are used for software testing. Underlying compressed sensing are concepts of sparsity, linear measurements, and recovery of sparse active signals. Regarding sparsity, there is a great variety of practical problems where there is an unknown vector x of large dimensions N that one would like to learn, but it is too expensive to measure all the coordinates of the vector. For group testing, given sufficiently many pooled tests, and assuming that only a small fraction of the pooled had the positive result, it is possible to identify the positive results. In one embodiment, for example in security testing, there is a very large number of individual tokens and combinations thereof, in the form of pairs and triplets (or patterns). Testing each individual token, pair and triplet of tokens through a sanitizer is impractical, requiring an immense number of calls to the sanitizer. However, it can be assumed that the vast majority of such patterns is innocuous, and only a very small fraction is malicious. Compressed sensing suggests to take a reduced set of aggregate measurements of the variable x, where each measurement involves a subset of variables $x_i$ together. For the application of software testing, in one embodiment, the method 100 can create a string composed of multiple tokens of interest.

Given these aggregate measurements, where each variable $x_i$ may appear in multiple tests (i.e., where each test involves a different but typically overlapping subset of indices), one would like to unmixed the measurements to be able to precisely explain the anomalies at the level of individual tokens, or individual positive results in a pool. The fact that this is at all possible may seem surprising, but it is based on very elegant theory building on linear algebra and geometry of polytopes. An efficient solution is available using numerical optimization (i.e., linear programming), which can recover the true identity of a sparse set of active inputs from a number of aggregate measurements that is much smaller than N. Applications of similar flavor occur in other diverse fields such as spectrum estimation, genetic disease testing, neuroscience, and even feature selection in machine learning.

For linear compressed sensing, if a vector $x \in R^N$ has a small number K of non-zero elements, K<<N. It is denoted that the number of non-zero elements of x using the $l_0$-norm notation: $\|x\|_0=K$. Further, M aggregate linear measurements $y_i=a_i^T x$, are taken where K<M<<N, and aggregate them into a vector y=[y1, . . . , yM] with y=Ax where the matrix A contains vectors $a_i$ as rows. Now, given y and knowing the measurement matrix A, if A was chosen properly, and if x is sparse enough, then the unknown sparse vector x can be recovered. Furthermore, this recovery can be done by an efficient optimization procedure, namely linear programming (LP). Note that this does not mean that one can solve the NP-hard problem using LP relaxations in general. This can be done only if the matrix is well-posed, as specified by the incoherence condition, and if the signal of interest x is sparse enough with respect to A. This condition is sufficient but not the tightest known condition. Stronger conditions have been developed based on the so-called Restricted Isometry Property, which considers larger subsets of columns of A, not just pairs. However, verifying RIP is just as hard as solving problem in general. In practice, RIP is used for random measurement matrices A, which fortunately can be shown to satisfy the RIP property with high probability.

With reference now to FIG. 1, the method 100 including steps 101-103 that can define a vocabulary of tokens to yield admissible inputs of a system, generate random test inputs based on combining inputs and input tuples, followed by application of these inputs into the system, and analyze the correlations between system failures and the tokens present in respective inputs to localize failures to particular inputs and input tuples.

That is, the method 100 utilizes Boolean compressed sensing of which measurements of a sparse unknown vector x can be aggregated even if the measurements may be non-linear. The background concept invented in this invention is described below. For the application to software testing, Boolean measurements can be used, where the vector x is binary and each measurement corresponds to a disjunction of a subset of entries of x.

To set up the notation and define the vocabulary, it is assumed that y, A and x are all binary {0, 1}. The Boolean vector $x \in \{0, 1\}$ N has K<<N non-zero (faulty) entries. Tokens j with $x_j=0$ are called 'normal'. A pooled measurement $y_i$ is the Boolean sum (i.e., Boolean OR) of $x_j$ in some subset $A_i \subset \{1 \ldots, N\}$ (i.e., $y_i = \vee_{j \in A_i} x_j$).

The M×N measurement matrix A satisfies $A_{ij}=1$ if item j belongs to the subset pooled in test i. Other entries are 0. $y=A \vee x$ is used as the vector notation to describe the entire set of M measurements.

Figure 2:
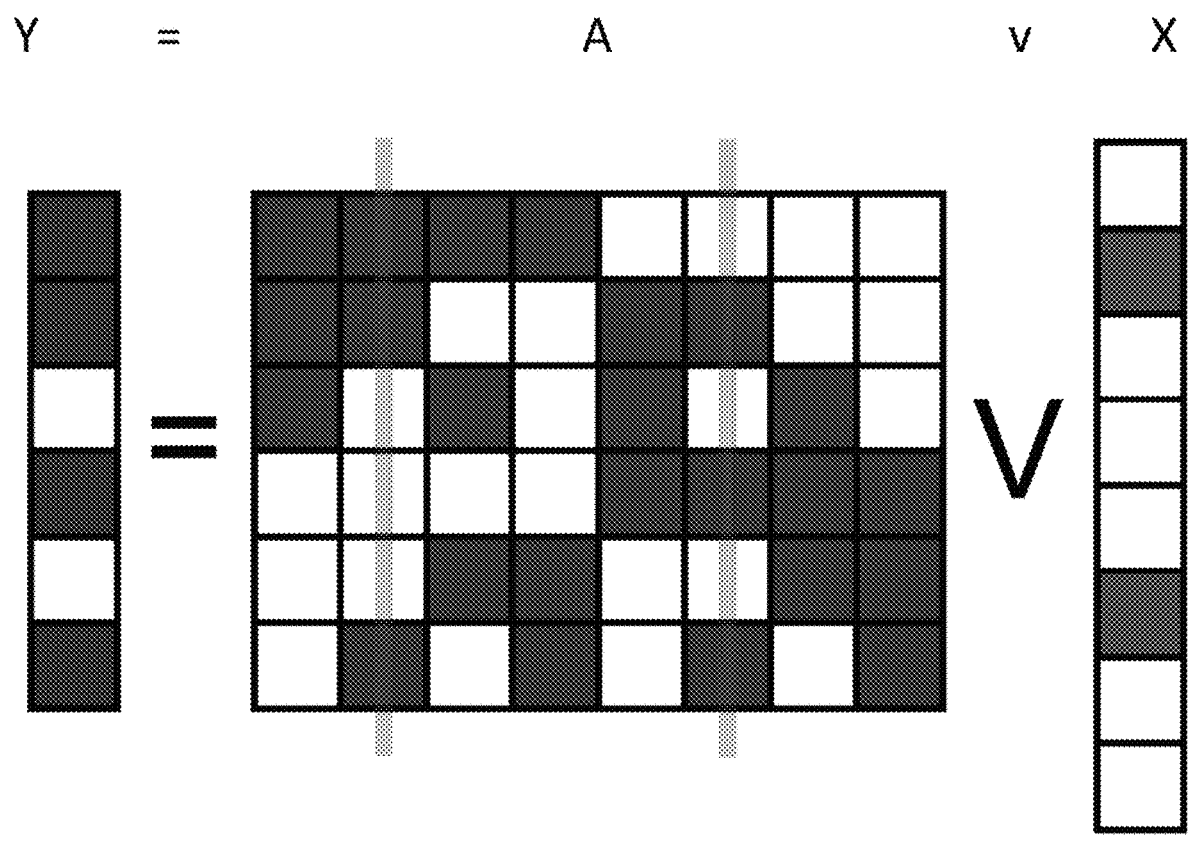

Exact recovery is parallel to the linear case such that if the matrix has well-distributed columns (as captured by the notion of distinctness, as defined below), and if the vector is sparse enough, then it can be uniquely recovered from the Boolean measurements (e.g., as shown in FIG. 2). It is noted that a measurement matrix A is K-separating if all Boolean sums of subsets of K columns are distinct. A is called K-disjunct if the union of any K columns does not contain any other column.

It is noted that the K-separating property for A is sufficient to allow exact recovery of w with up to K non-zero entries. However, finding the solution would in general require searching over all K-subsets out of N. K-disjunctness is a stronger condition, which allows successful recovery using simpler algorithms. The combinatorial algorithm asks to find the sparsest solution to the set of Boolean equations, which is done by solving the optimization problem of min $\|x\|_0$ such that $y=A \vee x_i$.

While the optimization problem appears very similar to the linear one, the key challenge is that the measurements are not linear. However, they can be represented equivalently by a pair of linear equalities and inequalities. By letting P={i|yi=1} be the set of measurements i, where yi is positive, and Z={i|yi=0} be the set of zero (or negative) tests, then one can see that for $i \in Z$ one has $A_Z \vee x = 0 \Leftrightarrow A_Z x = 0$ and for the set of positive measurements, in the boolean case $1 \vee 1 = 1$, while in the linear case $1+1=2$, but it is always true that $A_P \vee x = 1 \Leftrightarrow A_P x \geq 1$. These constraints can be incorporated into an equivalent integer program (IP) where:

$$\min \sum_{j=1}^n x_j$$

$$\text{s.t. } x_j \in \{0, 1\}, j = 1, \ldots, n$$

$$A_P x \geq 1$$

$$A_Z x = 0.$$

It is noted that since x is Boolean, the objectives in problems above are equivalent (i.e., $\|x\|_0 = \Sigma i\ x_i$), and yet the problem is NP-hard because of the Boolean integer constraint on the weights. However, relaxing the binary constraints to linear interval constraints, a tractable lineal program (LP) is obtained as:

$$\min \sum_{j=1}^n x_j$$

$$\text{s.t. } 0 \leq x_j \leq 1, j = 1, \ldots, n$$

$$A_P x \geq 1$$

$$A_Z x = 0.$$

Thus, assuming that there exists x* with K non-zero entries and $y=A \vee x^*$, if the matrix A is K-disjunct, then LP solution ^x in the above recovers x*, i.e. ^x=x*.

This is a sufficient condition, but it is not necessary. In practice, one can often apply the LP approach even if the LP yields a fractional solution with the help of randomized rounding or other approaches for mapping to binary numbers. In practical situations, one typically has noisy measurements. Noise in the y vector is considered, where some bits can flip from 0 to 1 and vice versa which is represented by $y=(A \vee x) \oplus n)$, To extend the LP formulation in the presence of noisy measurements (where $y=(A \vee x) \oplus n$), one looks for sparse rules that do not match y exactly, but rather approximate y very closely. The corresponding LP formulation is:

$$\min \sum_{j=1}^n x_j + C \sum_{i=1}^m \xi_i$$

$$\text{s.t. } 0 \leq x_j \leq 1, j = 1, \ldots, n$$

$$0 \leq \xi_i \leq 1, i \in \mathcal{P}$$

-continued $$0 \le \xi_i, i \in \mathcal{Z}$$

$$A_{\mathcal{P}}x + \xi_{\mathcal{P}} \ge 1$$

$$A_{\mathcal{Z}}x = \xi_{\mathcal{Z}}.$$

The regularization parameter C trades off two objectives: minimizing the sparsity of x versus minimizing a penalty on the number of errors in satisfying the Boolean equations. The parameter C is a tunable parameter of the model.

The Boolean compressed sensing problem, also known as the group-testing problem, extends compressed sensing to the problem of recovering a sparse signal from measurements that come from logical operations rather than linear algebraic operations. This setup has application to any domain that consists of locating the members of a particular subset M of a population Σ*.

For example, suppose there exists a test that can determine whether any subset O⊆Σ* of the population contains at least one member ω∈M of the subset one is trying to find. Clearly, the entire subset M can be located by conducting tests on each singleton subset {ω} for each member ω∈Σ, but this would require a large number of tests when the size of the population is large. When the tests themselves are expensive or the population is simply too large, this procedure is usually not practical (or even tractable).

As described, group testing is a method for locating the subset M by conducting as few tests as possible. This problem is now formalized to the application of testing for payloads. Let Σ={x1, . . . , xn} denote an alphabet (i.e., a vocabulary). One calls each individual element of the alphabet xi∈Σ a token. In the context of security testing, the population is the set of strings that can be derived from tokens in Σ, and one can denote this population of strings by Σ*, It is assumed that a finite bound on the length of strings in Σ*. The notation x∈ω is used if token x is used to derive string to. Assume that the subset $\mathcal{M} \subseteq \Sigma^*$ of the strings over Σ are specified as malicious. The malicious strings are referred to as payloads. In this application, testing subsets of the population Σ* is conducted by a so-called sanitizer. A sanitizer is a function S: Σ*→Σ⁻* that maps between strings. S is correct if ∀ω∈Σ*. $S(\omega) \notin \mathcal{M}$.

Given sanitizer S, string ω, and token x∈ω, one can say that S blocks x in ω if x∈/S(ω). S blocks ω if at least one of the tokens x∈ω is blocked. The problem is defined as: given sanitizer S, one would like to determine with high confidence whether S is correct. In other words, one would like to determine whether a sanitizer can recognize malicious strings in M, where recognition means that if a sanitizer accepts as input a malicious string, then its output is a different non-malicious string. A naive solution is to simply traverse all the strings ω∈M and apply S to each of them in turn. This is time consuming and costly. Another assumption is that many payloads in M share particular patterns that cause any string with such patterns to be blocked. If one can learn some of these patterns, then the number of payloads that must be tested in order to determine correctness of a sanitizer can be greatly reduced. Stated intuitively, the idea is to test different aggregate randomized strings over Σ (which may or may not be members of M). Group testing can be used to identify tokens that cause some of these random strings to be blocked, and these malicious tokens can be used to identify malicious patterns found in payloads. Formally, let U={ω1, . . . , ωM} be the set of M random strings built from the possible tokens. Define a matrix A with M rows and N columns by:

$$A_{ij} = \begin{cases} 1 & \text{if token } j \text{ appears in random string } i \\ 0 & \text{otherwise} \end{cases}$$

and the observed vector y as yi=1−S(ω$_i$), so that y$_i$ equals one if the i$^{th}$ random string is blocked by the sanitizer. In practice, sanitizer S blocks string ω if S(ω) does note equal ω (i.e., at least one of the tokens in ω$_i$ is not present in the sanitizer s output string). Define a variable x∈{0, 1}n, such that x$_i$=1 if inclusion of the i$^{th}$ token in a string is cause for being blocked by the sanitizer. Then the goal can be formulated by learning x such that A∨x=y, where (A∨x)i=V$j$n=1 (Aij∧xj), V is the boolean OR operator, and ∧ is the boolean AND operator.

x is learned by solving problem min ‖x‖$_0$ such that y=A∨x, which seeks to learn a minimal number of tokens that explain the output of the sanitizer. As this problem is not tractable, the method 100 solves:

$$\min \sum_{j=1}^{n} x_j + C \sum_{i=1}^{m} \xi_i$$

$$\text{s.t. } 0 \le x_j \le 1, j = 1, \ldots, n$$

$$0 \le \xi_i \le 1, i \in \mathcal{P}$$

$$0 \le \xi_i, i \in \mathcal{Z}$$

$$A_{\mathcal{P}}x + \xi_{\mathcal{P}} \ge 1$$

$$A_{\mathcal{Z}}x = \xi_{\mathcal{Z}}.$$

Therefore, in steps 101 and 102, for data generation, in general, any set that is described is based on an alphabet Σ={x1, . . . , xn} comprised of n tokens xi for i=1, . . . , n. Given the length restriction, there are a finite number of strings that can be created based on the alphabet Σ. The set of possible strings are donated as Σ*. In any experiment, one will sample m strings from Σ* and run a particular sanitizer on the m strings to generate a vector b that indicates whether or not each sample string is blocked by the sanitizer. Two questions remain how to represent each string and how to sample each string.

Both representations define the matrix A in the group-testing formulation, where the i$^{th}$ row of A represents the i$^{th}$ string. The first representation is token based and was previously described. In this representation, matrix A has n columns where n is the number of individual tokens. The i$^{th}$ string is represented by Ai•, where A$_{ij}$=1 if token j appears in the string and Aij=0 if it does not appear. The second representation is pattern-based. It only keeps track of what possible patterns can appear in strings. One represents patterns as tuples of tokens, such as ("a", "b", "c") for a pattern consisting of the three tokens "a", "b", "c". Such a representation requires apriori knowledge about the grammar of a language and a fixed bank of possible patterns. Then the i$^{th}$ string is rep-resented by Ai•, where A$_{ij}$−1 if pattern j appears in the string and A$_{ij}$=0 if it does not appear. In one exemplary experiment with results shown in FIG. 3, the alphabet (vocabulary) includes 70 tokens

| < | script | > |
|---|---|---|
| %PROBE_STRING% | + | { |
| toString | : | alert |
| expres\000073ion | / | } |

-continued

| javascript : | \t | valueOf |
| --- | --- | --- |
| ( | ) | eval |
| ' | ale | rt |
| /.source | x = | |
| ; | , | input |
| autofocus | onfocus | = |
| ` | style | div |
| font – family | expression | span |
| img | a | color |
| expres\\73ion | expres\\0073ion | \n |
| @import | http: // | .com |
| https : // | : \ | \ |
| .org | .net | url( |
| src | x | onerror |
| http : //ibm.com/x.jpg | onmouseover | http : //ibm.com |
| STUB | \\ | b |
| \\\\ | link | rel |
| stylesheet | type | text/css |
| href | < / | / > |
| \\x61\\x6c\\x65\\x72\\x74\\x28\\x31\\29 | | |

The strings are sampled in order to learn the tokens that truly explain a sanitizer (which one can refer to as the blocking tokens). The sample of strings needs to satisfy the following conditions that one must observe the blocking tokens in enough strings to be explainable. Hence, one needs each and every token to be observed in multiple strings. And, one must observe a sufficient number of blocked and un-blocked aggregate strings. Ideally, one should observe a balanced number of outputs: 50% blocked and 50% unblocked strings. Intuitively, if one observes only blocked or unblocked strings, then it would be impossible to model a sanitizer, so one must observe a mix. Mathematically, an even split (e.g., 50-50) maximizes the entropy of y.

It is modeled that the probability that a given token appears in a given string as a binomial random variable with success probability p (i.e., a shaded box is a token in FIG. 2). Designing A using a binomial distribution results in a nearly K-disjunct design matrix with high probability. Each string is then a function of 4,970 binomial random variables (70 individual tokens and 4,900 possible pairs). If patterns are used, then the probability of each pattern appearing in the siring is modeled as a binomial random variable. A pattern is constructed using the tokens that constitute it with any needed randomly generated text. For example, considering the pattern (</,>), which consists of two ordered tokens. A substring based on the pattern is generated by padding before, in between, and after the two tokens in the pattern with random characters from [a-zA-Z0-9]. This substring is then appended to substrings generated based on other patterns to be included in the string.

There are two choices for padding between tokens or patterns. One method is to use alphanumeric padding similarly to the way that one does the padding for pattern generation. Another method would be to use a delimiting character that is not part of the alphabet. A delimiter would uniquely disambiguate different patterns in a string, whereas alphanumeric padding would create issues such as making it difficult to decipher where one pattern ends and the next begins.

That is, when testing tokens versus patterns, two main challenges remain in the generation of token-based strings. These relate to the number of samples and the sensitivity to token ordering.

Firstly, this representation requires many more samples to properly explain the sanitizer (which makes sense since less information is known, i.e. the possible patterns are assumed to be unknown). Suppose the sanitizer that is being analyzed blocks any string with the pattern </[a-zA-Z0-9]*>j(/[a-zA-Z0-9]*) (i.e., open and close angle brackets or parentheses with alphanumeric text in between), and consider two strings: "</eval>" and "(eval)". The framework would explain the sanitizer as blocking any string that contains the token eval, because this is the simplest (and mathematically cheapest) explanation. More samples with the token eval that are not blocked must be in the sample set in order to learn that eval is not a malicious token.

Secondly, this representation does not take token ordering into account. Consider strings "</eval>" and ">eval</". Then any string with the angle brackets in the opposite order will obviously not be blocked by the sanitizer, but will have the same inner product with the solution x as a string with the malicious pattern. Robustness from the slack variable $\xi$ in problem can handle such a situation. However, consider a string that appends ">eval</" to another substring containing a malicious pattern consisting of three tokens. Even though the first substring contains angle brackets in the wrong order, it will be detected as the simpler explanation of the sanitizer than the true three malicious tokens.

Figure 3:
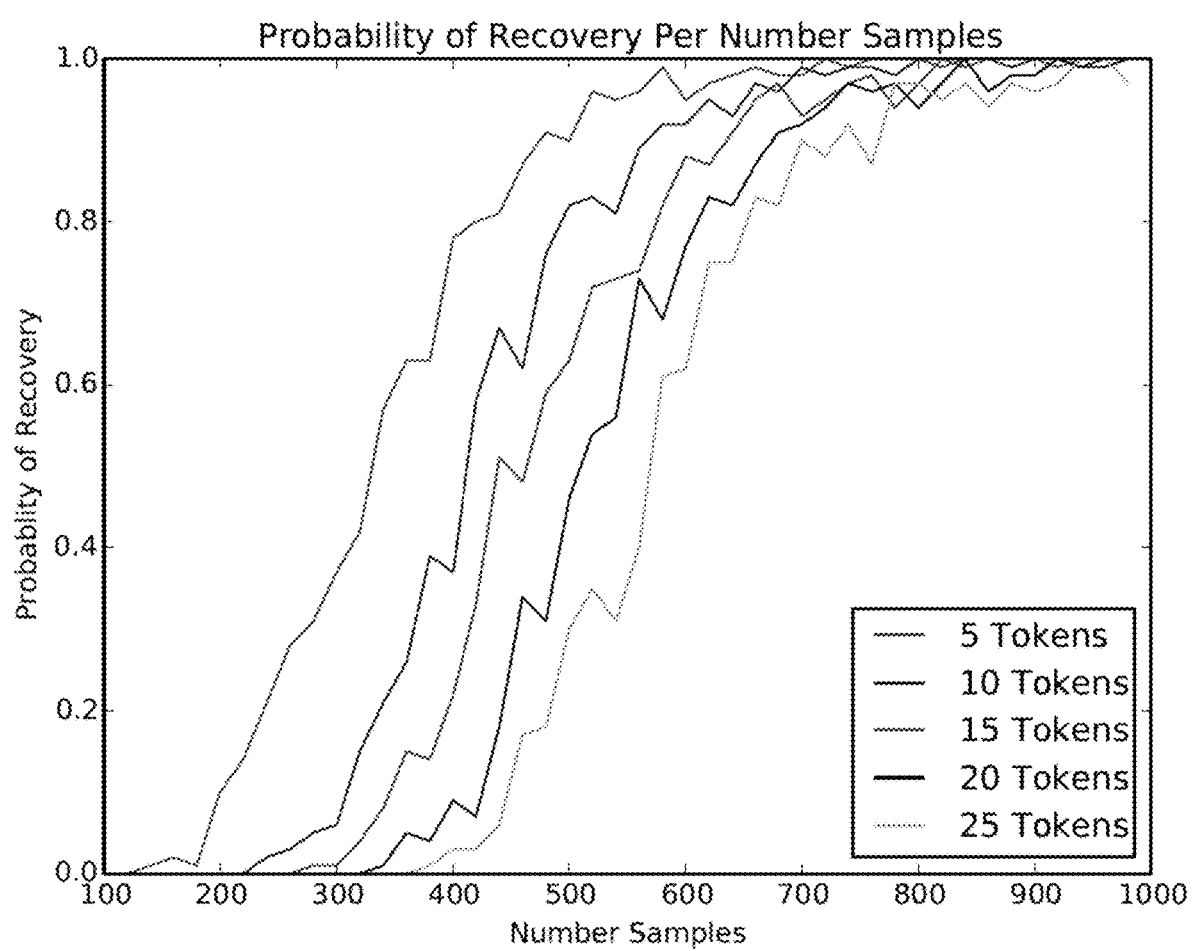
FIG. 3 exemplarily depicts experimental results according to an embodiment of the present invention.

Pattern-based string generation, i.e. concatenating patterns to form strings as described above, absolves the framework of these two token-based issues. The first issue is taken care of because it is assumed the sanitizer can be explained by a fixed number of patterns that one is aware of, which in practice implies that one does not need to learn what the patterns are from the tokens themselves. Regarding ordering, the patterns also take into account the possible ordering of tokens that one is are looking for, since one can specify the order of tokens in a pattern. In the experiments (for example, as shown in FIG. 3), the set of possible patterns are created as the union of all individual tokens and pairs of to-kens. Specifically, both patterns ("a","b") and ("b","a") for each pair "a" and "b" of tokens in the alphabet are included.

However, concatenating patterns creates strings that may contain other patterns. For example, (</,>), ((,)), and (>,( ) and the string "</eval> (eval)". While two patterns were used to generate the string, the ground truth is that the string contains all three patterns. Hence, the sampling strategy of a binomial distribution to include or not include patterns actually introduces unintended patterns in practice. In order to create a ground truth based on the actual desired patterns, one can create delimiting substrings with the character "!". Hence, the string above would appear in the framework as "</eval>!(eval)", which consists of merg-ing the two substrings "</eval>" and "(eval)". The matrix A in the group-testing problem (12) then correctly represents an indicator matrix of the desired sampled patterns in each string.

Referring now to FIG. 3 and an exemplary use case with seven sanitizers, the sanitizers are the regular expressions described as:
1. "((%3C)|<)((%2F)|/)[a-zA-Z0-9\%]*((%3E)|>)" which matches "</alphanumerictext>"
2. "((%3C)|<)((%69)|i|(%49))((%6D)|m|(%4D)) ((%67)|g|(%47))[^\n]+((%3E)|>)" which matches "<img anycharacters(except newline)>"
3. "((%3C)|<[^\n]+((%3E)|>)" which matches "<anycharacters(except newline)>"
4. "(script)|(javascript:)|(<\[a-zA-Z0-9\%]+>)|([a-zA-z0-9\%]+)" which matches "script" or "javascript:" or "<\alphanumerictext>" or "(alphanumerictext)"
5. "(<\[a-zA-Z0-9\%]+>)|([a-zA-Z0-9\%]+)" which matches "</alphanumerictext>" or "(alphanumerictext)"

6. "(!script!)|(!javascript:!)|(!<\[a-zA-Z0-9\%]+>!)|!([a-zA-Z0-9\%]+!)" which matches "!script!" or "!javascript:!" or "!<\alphanumerictext>!" or "!(alphanumerictext)!"
7. "(!<\[a-zA-Z0-9\%]+>!)|!([a-zA-Z0-9\%]+!)" which matches "!<\alphanumerictext>!" or "!(alphanumerictext)!"

It noted that the first four sanitizers do not account for the delimiter !, while the last two do account for the delimiter !. In fact, sanitizers 4 and 6 are the same, except for the delimiter, as are sanitizers 5 and 7. Patterns can recognize particular characters as well as hex equivalents.

The framework is implemented in Python. Strings are generated as described above based on the 70 tokens (i.e., step 102). Each individual token and every pair of tokens is considered as a possible malicious pattern to detect in any given sanitizer, yielding a total of 70+70²=4970 possible patterns (i.e., N=4970 when creating the matrix A in the group-testing problem). A fixed number M of random strings to generate is input. Given M, N, a probability p, the potential patterns and a sanitizer (or regular expression in the case), the frame-work works as follows:

1. Create M random strings. For each string: sample which patterns will appear in the string using a binomial distribution with probability p and create a substring for each pattern (with padding be-fore, in between, and after each token of the pattern), and append the substrings to form the sample string. Note that each padding is a random number of characters (up to 10) from the set [a-zA-Z0-9].
2. Generate y by running each string through the sanitizer. If the output is different than the input, then set yi=1 and yi=0 otherwise.
3. Solve problem below and output the resulting x.

$$\min \sum_{j=1}^{n} x_j + C \sum_{i=1}^{m} \xi_i$$

$$\text{s.t. } 0 \leq x_j \leq 1, j = 1, \ldots, n$$

$$0 \leq \xi_i \leq 1, i \in \mathcal{P}$$

$$0 \leq \xi_i, i \in \mathcal{Z}$$

$$A_\mathcal{P} x + \xi_\mathcal{P} \geq 1$$

$$A_\mathcal{Z} x = \xi_\mathcal{Z}.$$

It is noted that that the invention is solving the problem above, which allows for errors by the sanitizer, rather in the conventional techniques, which assumes a perfect sanitizer. Sanitizers in the experiments currently output with 100% accuracy although the framework does allow for mistakes in the event that noise exists (in which case the parameter C must be tuned).

Each entry of the resulting x from solving the problem corresponds to a pattern. Entries with non-zero values are patterns used to explain the sanitizer being tested. The goal is to obtain an x with a few entries equal to one, which most likely means that one has properly learned what patterns explain the sanitizer. If there are not enough sample strings, or if the sampling procedure simply didn't sample enough of the malicious patterns, then other solutions might come from solving problem. These solutions are the correct solutions to the optimization problem, because one knows how to solve the optimization problem optimally (since it is a simple linear program). In such cases where the solution is not the correct sanitizer explanation, one typically observe many positive entries in x with small values, which is a result of the relaxation of the binary constraints in the conventional techniques.

FIG. 3 displays the probability of recovery as a function of the number of malicious tokens in a sanitizer, for the most general case of individual malicious tokens (e.g., tokens in the figure can be replaced by patterns). The Binomial distribution has p=0.01, meaning that in each sample there is a 1% probability of each pattern appearing in the string. For example, the first curve on the left analyzes a sanitizer that blocks any string containing any one of five distinct patterns. This curve says that the sanitizer can be fully explained with almost 100% accuracy with about 575 observations. Each observation requires running the sanitizer. This is much better than the alternative of running the sanitizer on strings that each contain a single pattern, which would require 4,970 observations (i.e. 4,970 invocations of the sanitizer). With only 300 observations, group testing will correctly identify the malicious patterns 50% of the time. Since the curves increase rapidly, the additional number of observations to greatly increase the likelihood of success is quite small. This describes the power of group testing. By combining patterns in tests, one can greatly reduce the number of sanitizations required to fully explain the sanitizer with high likelihood of success.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access; capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and ran arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud; the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 4, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interlaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
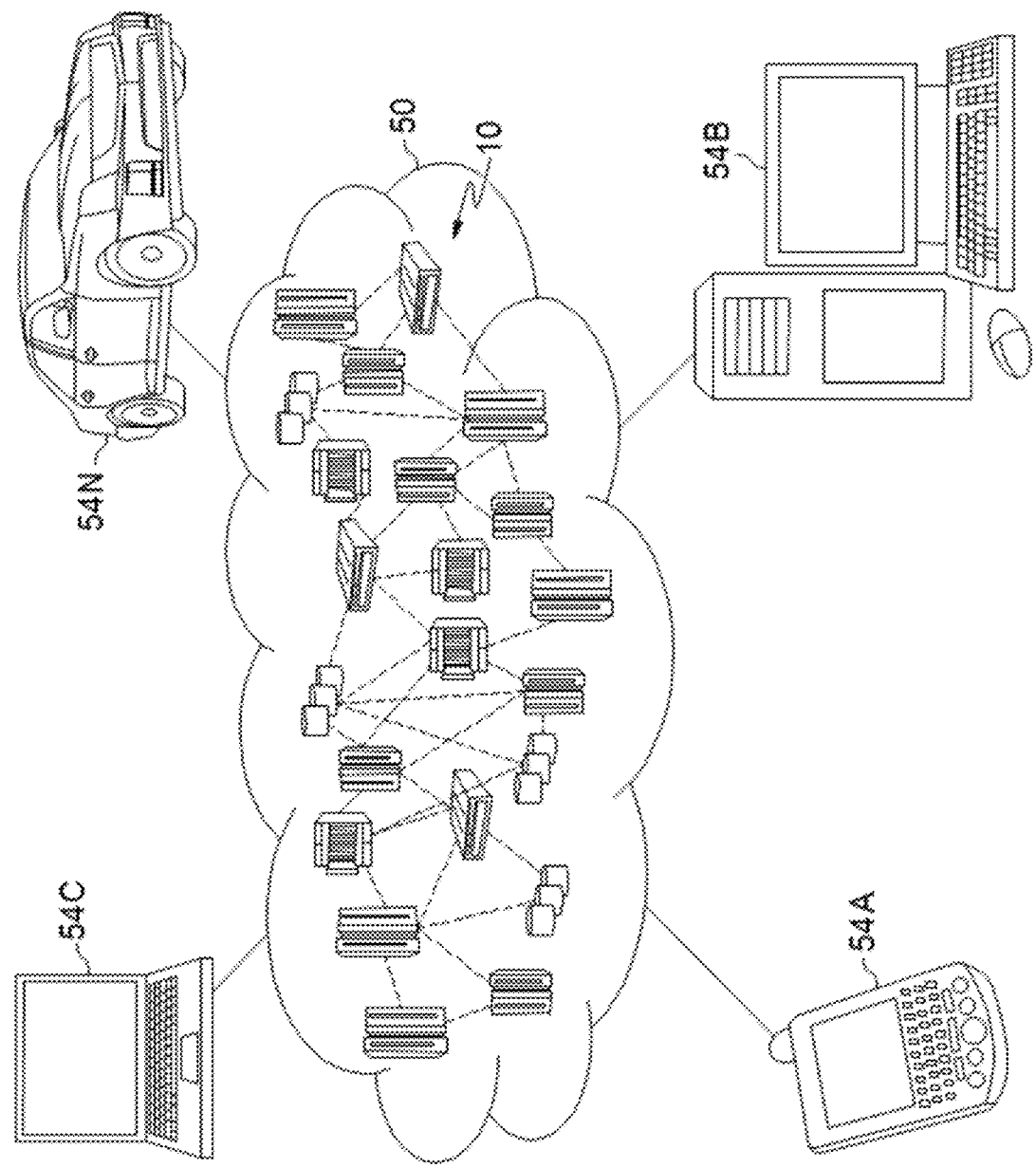
FIG. 5 depicts a cloud computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser).

Figure 6:
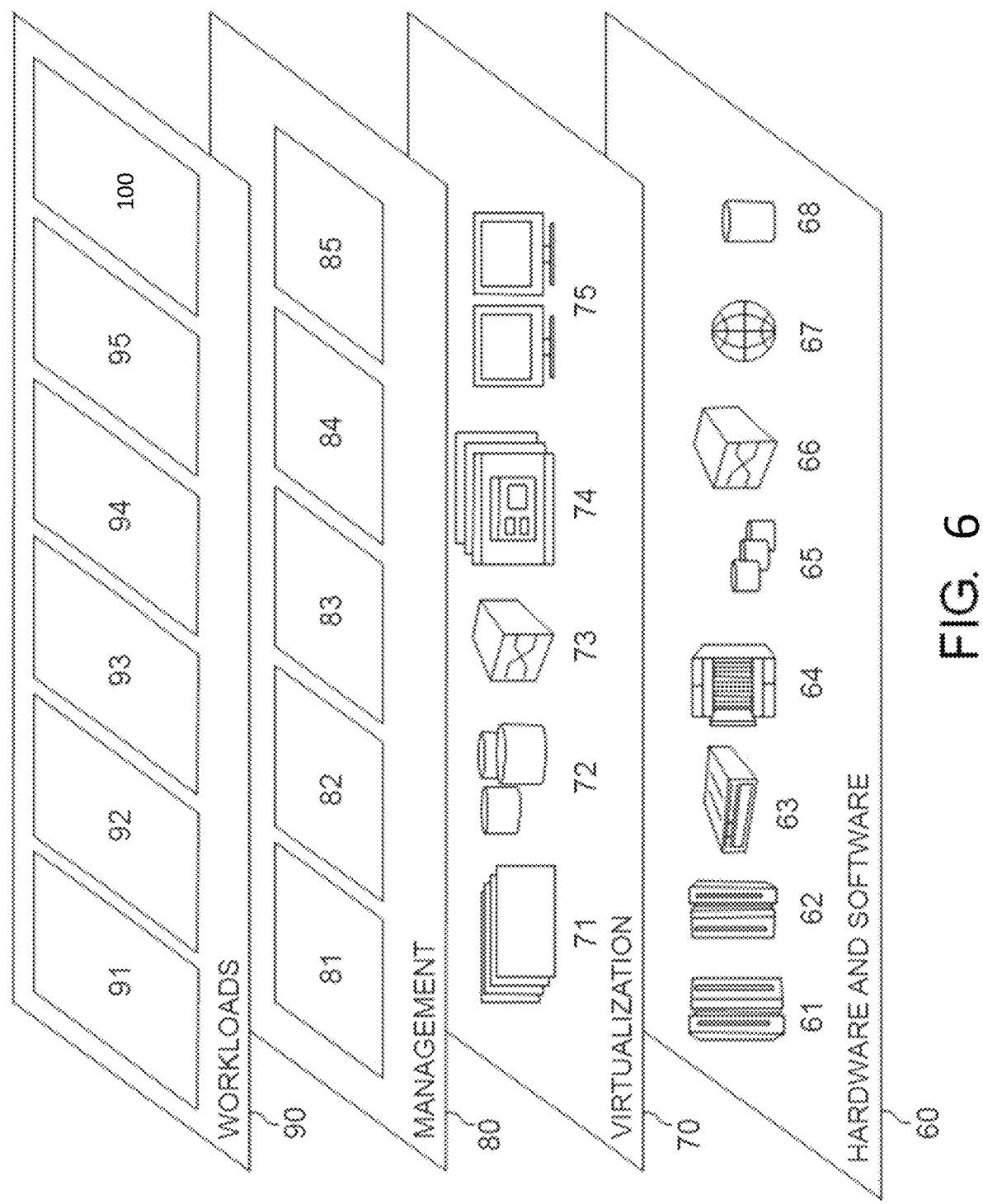
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62: servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91: software development and lifecyele management 92; virtual classroom education delivery 93; data analytics processing 94; transaction processing 95; and, more particularly relative to the present invention, the Software optimization method 100.

The present invention may be a system, a method, and/or a computer program product at any possible technical detail level of integration. The computer program product may include a computer readable storage medium (or media) having computer readable pro grain instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the compute readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented method, the method comprising:

integrity testing of a software utilizing Boolean compressed sensing of which Boolean measurements of a sparse unknown vector are aggregated even when measurements are non-linear via:

defining a vocabulary of tokens to yield admissible inputs of a system;

generating random test inputs as a number of queries based on combining inputs and input tuples, followed by application of these inputs as the number of queries into the system; and analyzing correlations between system failures and the tokens present in respective inputs to localize failures to particular ones of the inputs and the input tuples, wherein the number of queries is limited such that the analyzing recovers a subset of items from the inputs and input tuples, wherein the correlation analysis is modeled as a group-testing problem and the analyzing performs group-testing analysis to isolate the inputs that are responsible for the system failures, wherein exact recovery is parallel to a linear case such that if the unknown vector in a matrix form has well-distributed columns and if the unknown vector is sparse, then it is uniquely recovered from the Boolean measurements, wherein the unknown vector in the matrix form has well-distributed columns as captured by a notion of disjunctness by using a combinatorial algorithm which finds a sparsest solution to the set of Boolean equations, wherein the random test inputs include a portion of blocked aggregate strings and a portion of unblocked aggregate strings, wherein the combining inputs and input tuples are pattern-based string generation, and wherein a probability of each pattern of the input tuple appearing in the random test inputs is modeled as a binomial random variable, where the pattern is constructed using the tokens that constitute the pattern with a randomly generated text and a substring based on the pattern is generated by padding before, in between, and after two tokens in the pattern with random characters.

2. The computer-implemented method of claim 1, wherein the portion of blocked aggregate strings equals the portion of unblocked aggregate strings.

3. The computer-implemented method of claim 1, embodied in a cloud-computing environment.

4. The computer-implemented method of claim 1, wherein the unknown vector x is binary and each measurement corresponds to a disjunction of a subset of entries of the vector x.

5. The computer-implemented method of claim 1, wherein the solving for the sparsest solution includes solving an optimization problem using the combinatorial algorithm via min $\|x\|_0$ such that y=A v x.

6. A computer program product, the computer program product comprising a computer-readable storage medium having program instructions embodied therewith, the program instructions executable by a computer to cause the computer to perform:

integrity testing of a software utilizing Boolean compressed sensing of which Boolean measurements of a sparse unknown vector are aggregated even when measurements are non-linear via:

defining a vocabulary of tokens to yield admissible inputs of a system;

generating random test inputs as a number of queries based on combining inputs and input tuples, followed by application of these inputs as the number of queries into the system; and analyzing correlations between system failures and the tokens present in respective inputs to localize failures to particular ones of the inputs and the input tuples, wherein the number of queries is limited such that the analyzing recovers a subset of items from the inputs and input tuples, wherein the correlation analysis is modeled as a group-testing problem and the analyzing performs group-testing analysis to isolate the inputs that are responsible for the system failures, wherein exact recovery is parallel to a linear case such that if the unknown vector in a matrix form has well-distributed columns and if the unknown vector is sparse, then it is uniquely recovered from the Boolean measurements, and wherein the unknown vector in the matrix form has well-distributed columns as captured by a notion of disjunctness by using a combinatorial algorithm which finds a sparsest solution to the set of Boolean equations, wherein the random test inputs include a portion of blocked aggregate strings and a portion of unblocked aggregate strings, wherein the combining inputs and input tuples are pattern-based string generation, and wherein a probability of each pattern of the input tuple appearing in the random test inputs is modeled as a binomial random variable, where the pattern is constructed using the tokens that constitute the pattern with a randomly generated text and a substring based on the pattern is generated by padding before, in between, and after two tokens in the pattern with random characters.

7. The computer program product of claim 6, wherein the portion of blocked aggregate strings equals the portion of unblocked aggregate strings.

8. A system, said system comprising:

a processor; and a memory, the memory storing instructions to cause the processor to perform integrity testing of a software utilizing Boolean compressed sensing of which Boolean measurements of a sparse unknown vector are aggregated even when measurements are non-linear by:

defining a vocabulary of tokens to yield admissible inputs of a system;

generating random test inputs as a number of queries based on combining inputs and input tuples, followed by application of these inputs as the number of queries into the system; and analyzing correlations between system failures and the tokens present in respective inputs to localize failures to particular ones of the inputs and the input tuples, wherein the number of queries is limited such that the analyzing recovers a subset of items from the inputs and input tuples, wherein the correlation analysis is modeled as a group-testing problem and the analyzing performs group-testing analysis to isolate the inputs that are responsible for the system failures, wherein exact recovery is parallel to a linear case such that if the unknown vector in a matrix form has well-distributed columns and if the unknown vector is sparse, then it is uniquely recovered from the Boolean measurements, and wherein the unknown vector in the matrix form has well-distributed columns as captured by a notion of disjunctness by using a combinatorial algorithm which finds a sparsest solution to the set of Boolean equations, wherein the random test inputs include a portion of blocked aggregate strings and a portion of unblocked aggregate strings, wherein the combining inputs and input tuples are pattern-based string generation, and wherein a probability of each pattern of the input tuple appearing in the random test inputs is modeled as a binomial random variable, where the pattern is constructed using the tokens that constitute the pattern with a randomly generated text and a substring based on the pattern is generated by padding before, in between, and after two tokens in the pattern with random characters.

9. The system of claim 8, wherein the portion of blocked aggregate strings equals the portion of unblocked aggregate strings.

10. The system of claim 8, embodied in a cloud-computing environment.

* * * * *